Jan. 19, 1932. A. G. PRYOR 1,842,115
DISK HARROW
Filed Oct. 28, 1930 3 Sheets-Sheet 2

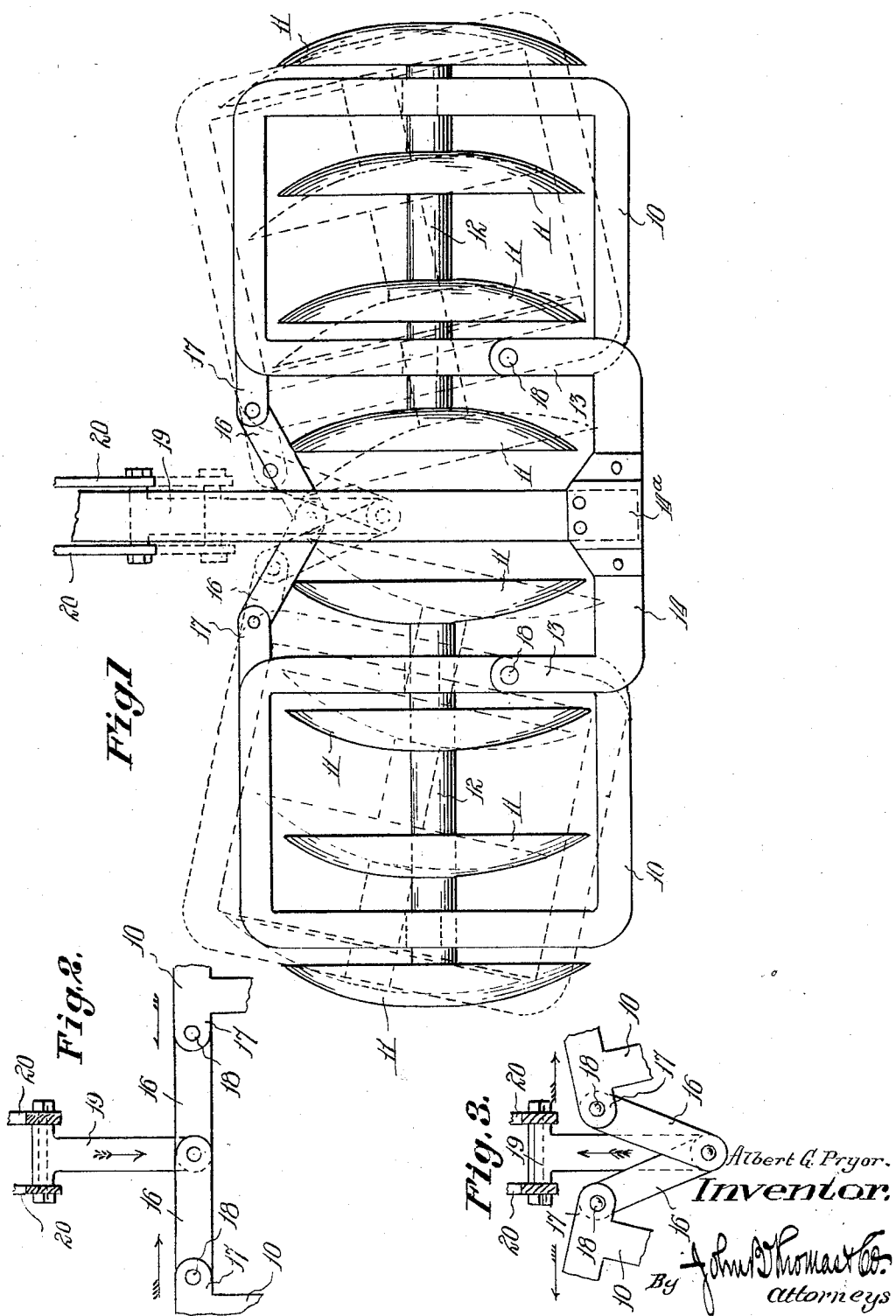

Albert G. Pryor.
Inventor.

By John D. Thomas & Co.
Attorneys

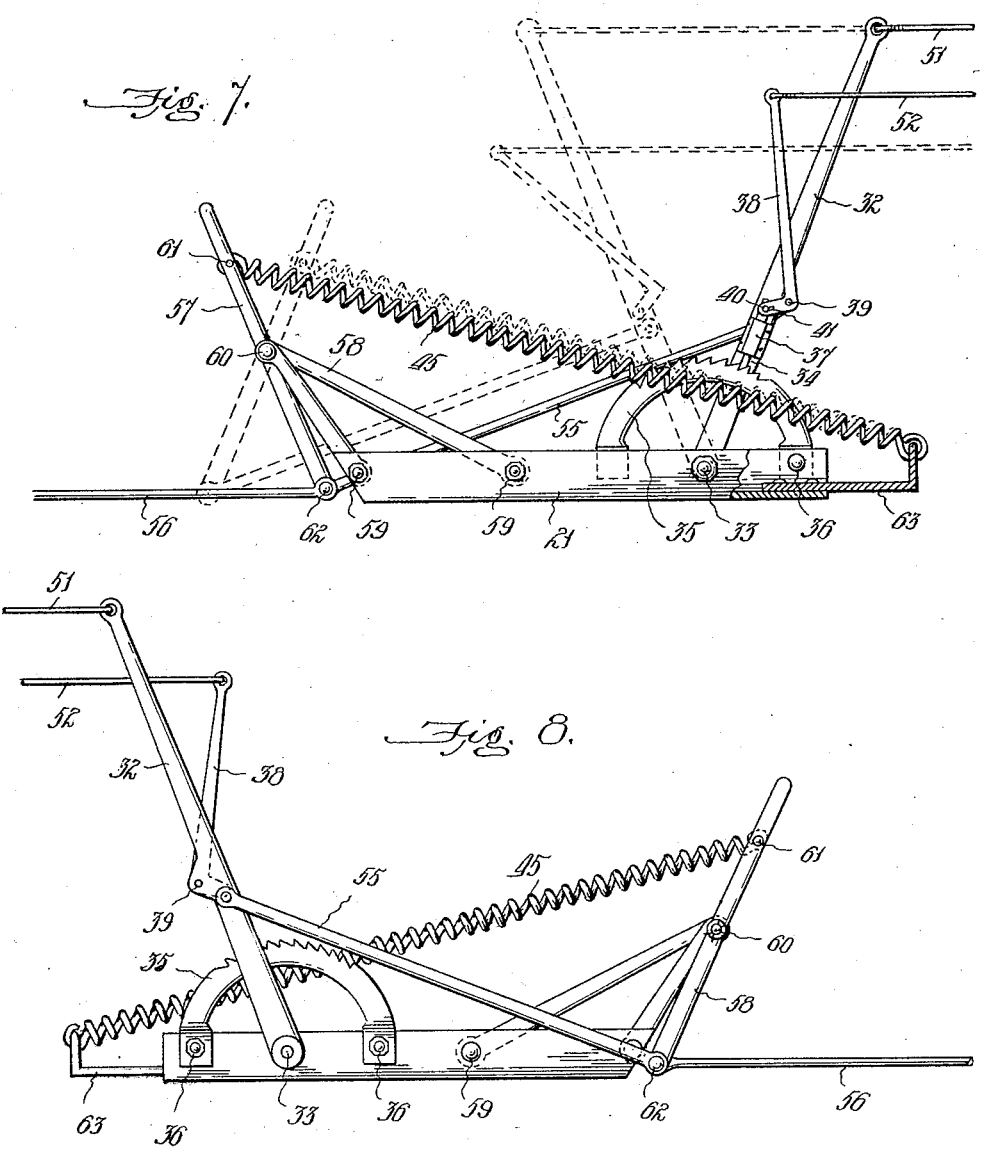

Patented Jan. 19, 1932

1,842,115

UNITED STATES PATENT OFFICE

ALBERT G. PRYOR, OF SANTA CRUZ, CALIFORNIA

DISK HARROW

Application filed October 28, 1930. Serial No. 491,783.

My invention is an improvement in disk harrows and relates more especially to that particular type in which two or more gangs of cutting disks are mounted in separate frames pivotally connected to supporting means secured to the draft-bar so that said frames may be shifted to position the cutting disks at an angle for operation of the harrow in cultivating, the harrow being drawn by a tractor to which the draft-bar is connected.

The primary object of my invention is to provide a disk harrow of this general type with means for shifting the pivoted frames carrying the gangs of disks to position said frames and disks at the proper angle with respect to each other for operation in cultivating or on a line with each other with the cutting disks in line of draft so that the harrow may be easily turned, the shifting mechanism in the present instance being spring-actuated in one direction to bring the frames in line with each other when the lever operated by the driver of the tractor is released.

My invention contemplates a construction of disk harrow in which the pivoted frames carrying the gangs of cutting disks are connected by a toggle joint, for movement of the frames with respect to each other, with a sliding bar connected to the knee of the joint and operated by a hand lever and interposed connections under spring tension, the hand lever having a pawl engaging a segment rack to hold said hand lever against the tension of the spring; together with means extending from the hand lever and pawl for operating the same from the tractor; all as hereinafter fully described and specifically set forth in the appended claims.

In the drawings:—

Figure 1 is a plan view of a disk harrow showing the application of my invention thereto.

Figs. 2 and 3 are detail views of the toggle joint and bar for operating the same.

Like numerals of reference indicate like parts in the several views of the drawings.

Figure 4:
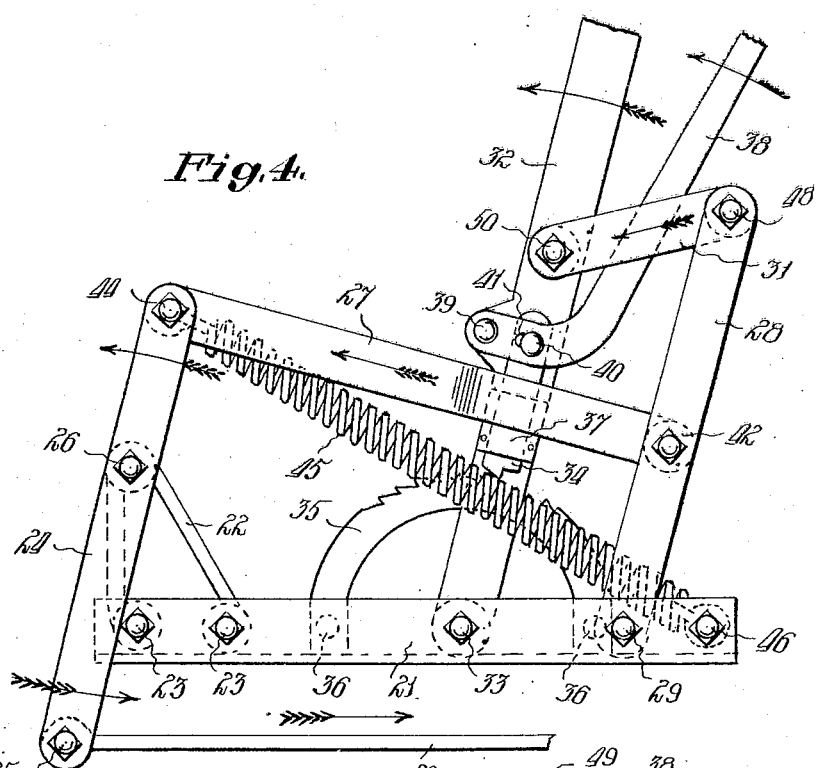
Fig. 4 is a side elevation, enlarged, showing the mechanism for operating the toggle joint connecting the frames of the harrow.
Figure 5:
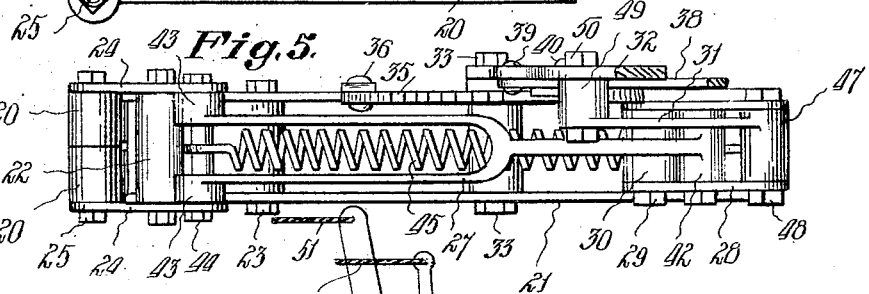
Fig. 5 is a plan view of Fig. 4.
Figure 6:
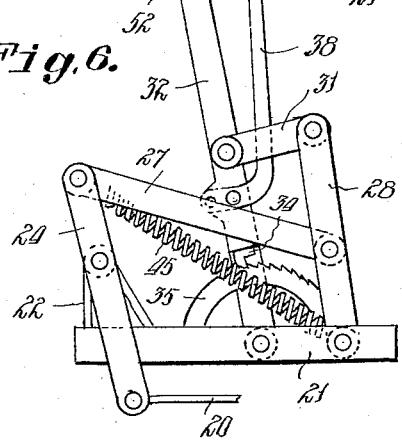
Fig. 6 is a side elevation of the shifting mechanism showing the same in reverse position to that illustrated in Fig. 4, and Figs. 7 and 8 are side elevations illustrating modifications of the mechanism for operating the toggle joint.

My invention is illustrated applied to that type of disk harrow comprising rectangular frames 10—10, which carry the gangs of cutting disks 11 mounted on transverse shafts 12 journalled in said frames respectively, and are pivotally connected to the forward ends 13 of a U-shaped hanger or crossbar 14 secured by plate 14a to the rear end of a draft-bar 15 by which the harrow is attached to the tractor, whereby said frames may be swung to a position on a line with each other for positioning the cutting disks in line with the draft-bar as shown in full lines in Fig. 1 of the drawings or at an angle to each other as shown in dotted lines, and for holding the frames in either position as well as to provide for shifting the same the forward ends of said frames opposite their pivotal connection to the hanger are connected by a toggle joint the bars 16—16 of which are pivoted to short arms 17 projecting from the frames. For moving these harrow frames on their pivots 18 through the intervention of the toggle joint a sliding bar 19 is connected to the knee of said joint and operated by links 20 extending from the mechanism shown in Figs. 4 to 6 inclusive, it being noted by reference to Fig. 1 that the sliding bar is located below the draft bar and that the connecting links 20 extend along opposite sides of said draft-bar. This is one type of disk harrow to which the operating means hereinafter described, including the toggle joint, are applicable, and it will be understood that my invention may be used in connection with any other type of harrow in which gangs of cutting disks are employed and adapted to be shifted in and out of line of draft.

The mechanism for sliding the bar 19 which operates the toggle joint is supported on a base 21 secured to the forward part of the draft-bar 15 and preferably in the form of a channel-bar to the upstanding side members of which the parts of the shifting mechanism are attached. Rising from the forward end of this channel bar is a bracket 22 the lower ends of the legs of which are secured between the members of said channel bar by means of bolts 23, and to the upper end of said bracket at opposite sides thereof are fulcrumed a pair of levers 24—24 between the lower ends of which the connecting links 20 extending from the slide bar 19 are attached by bolt 25, said pair of levers projecting above their pivot or fulcrum 26, and to their upper ends is connected a rod or link 27 extending from a like pair of levers 28 pivoted at their lower ends to a bolt 29 extending between the side members of the channel bar or supporting base 21 at the opposite end thereof from the other pair of levers with an interposed spacing sleeve 30. The last mentioned pair of levers are connected by a link 31 to an operating hand lever 32 pivoted at one side of the supporting base or channel bar on the outer end of a transverse bolt 33, adjustment of said lever for varying the angle of the cutting disks with respect to the line of draft being effected by means of a sliding pawl 34 on the lever engaging a segment-rack 35 secured to the adjoining side of the supporting base by bolts 36. The pawl slides in a keeper 37 secured to one side of the hand lever and operates by gravity to engage the segment-rack, and for releasing this pawl there is a bent lever 38 pivoted at its forwardly bent lower end by pin 39 to the hand lever and connected by pin 40 to the upper end of the pawl, the last mentioned pin passing through a slot 41 in the lever to permit of the required throw of the latter in operating the pawl. As will be noted by reference to Fig. 5 the link 27 pivoted between the pair of levers 28 by hub 42 is bifurcated at its forward end the members terminating in hubs 43 journalled on bolt 44 extending between the pair of levers 24, and attached to said bolt between the hubs is a strong helical spring 45 extending from said bolt to the rear end of the supporting base or channel bar for attachment to a transverse bolt 46 extending between the side members of said channel bar, said spring exerting a pulling force on the upper end of the levers connected to the toggle joint for bringing the harrow frames in normal position on a line with each other when the pawl of the hand lever is released. It will also be noted that the link 31 is provided at one end with a hub 47 for pivotal connection by bolt 48 between the pair of levers 28 and is provided at its other end with a hub 49 at one side thereof for pivotal connection by bolt 50 to the hand lever. In the present instance both the hand lever 32 and pawl operating lever 38 are operated by ropes 51 and 52 attached to said levers respectively from which they extend to the tractor so as to be within easy reach of the driver.

The construction and operation of my improved mechanism for shifting the position of gangs of harrow disks with respect to the line of travel, and for varying the angle of the disk gangs with respect to each other, will be readily understood from the foregoing description in connection with the accompanying drawings, for to change the gangs of cutting disks from normal to cultivating position the driver of the tractor or operator of the harrow pulls on the rope 51 which will move the hand lever 32 forward and will transmit a similar motion to the pair of levers 28 and upper end of the pair of levers 27 through the instrumentality of the connecting links 31 and 27, this movement being in opposition to the action of the spring 45, and as the lower end of the pairs of levers 27 move rearwardly they will impart a similar movement to the slide bar 19 through the link connections 20 to operate the toggle joint connected to the frames carrying the cutting disks thus shifting the gangs of disks to opposite angles to each other as indicated in dotted lines Fig. 1, the degree of the angles being regulated by the extent to which the hand lever is operated. When it is desired to return the gangs of disks in line with the travel of the harrow for turning, as illustrated in full lines Fig. 1, it is only necessary for the driver or operator to pull on the rope 52 which will release the pawl and permit the spring to move the several levers backward to exert a pull on the slide bar connected to the toggle joint.

In the modified form of operating mechanism shown in Figs. 7 and 8 the hand lever 32 pivoted to the channel bar 21 on the fulcrum-bolt 33 and operated by rope or cable 51 is also provided with a sliding pawl 34 retained by keeper 37 and retracted to disengage the segment rack 35 by bent lever 38 pivoted at 39 on the hand lever and connected to the sliding pawl by pin 40 working in slot 41 in said bent lever to which the operating rope or cable 52 is attached; but in this instance the hand lever is connected by a rod or link 55 directly to the rod or link 56 extending from the slide 19 or connected directly to the knee of the toggle joint which operates the frames 10—10 carrying the disk harrows, and for moving the hand lever and connecting rod in one direction by spring 45 there is a lever 57 pivoted to an inclined supporting bracket 58 secured to the channel bar at the opposite end thereof from the lever by means of bolts 59, 59, said lever being centrally fulcrumed at 60 and the spring connected thereto by cross-pin 61, while at its lower end it is connected by the same bolt, as 62, that forms the connection between the rods or links 55 and 56. It will thus be seen that the hand lever for shifting the harrow frames is directly connected to the rod or link extending from the toggle joint, with the auxiliary lever 57 cooperating with the spring 45 for moving the harrow frames to normal position when the hand lever is released, whereas in the other form, showing on sheet 2 of the drawings, the intermediate connections between the hand lever and rod or link extending from the toggle joint provide for a greater leverage, and consequently it will be understood that either form may be used as desired, and therefore I do not limit my invention to what is herein shown and described but reserve the right to such further modifications and changes as may come within the spirit and scope of the appended claims.

I claim:—

1. A disk harrow comprising a reach bar with a hanger attached to the rear end thereof, supporting frames pivoted at their rear ends to the hanger and each carrying a gang of cutting disks, a toggle joint the bars of which are connected at their outer ends to the frames for moving the latter upon their pivots, and means connected to the knee of the joint for operating the same.

2. A disk harrow comprising a reach bar with a hanger attached to the rear end thereof, supporting frames pivoted at their rear ends to the hanger and each carrying a gang of cutting disks, a toggle joint the bars of which are connected at their outer ends to the frames for moving the latter upon their pivots, a slide bar connected to the knee of the toggle joint, and means for operating said slide bar.

3. In combination with a disk harrow having gangs of cutting disks each gang pivoted at one end to the supporting frame of the harrow, a toggle joint the bars of which are connected at their outer ends to the gangs of disks for swinging them on their pivots, a slide bar connected to the knee of the toggle joint, and means for operating said slide bar.

4. In combination with a disk harrow having gangs of cutting disks each gang pivoted at one end to the supporting frame of the harrow, a toggle joint the bars of which are connected at their outer ends to the gangs of disks for swinging them on their pivots, a slide bar connected to the knee of the toggle joint, a spring-actuated lever connected to the slide bar for moving the same automatically in one direction, and means for holding the lever against the action of the spring when moved in opposition to said spring.

5. In combination with a disk harrow having gangs of cutting disks each gang pivoted at one end to the supporting frame of the harrow, a toggle joint the bars of which are connected at their outer ends to the gangs of disks for swinging them on their pivots, a slide bar connected to the knee of the toggle joint, a lever connected to the slide bar for operating the same, a spring connected to the lever for actuating the same in one direction, means for holding the lever against the action of the spring when moved in opposition to said spring, and means for releasing said holding means.

6. In combination with a disk harrow having gangs of cutting disks each gang pivoted at one end to the supporting frame of the harrow, of a toggle joint the bars of which are connected at their outer ends to the gangs of disks for swinging them on their pivots, a slide bar connected to the knee of the toggle joint, a lever connected to the slide bar, and a spring actuating the lever in one direction; together with a lever for moving the aforesaid lever in the opposite direction, and means for releasing the last mentioned lever.

7. In combination with a disk harrow having gangs of cutting disks each gang pivoted at one end to the supporting frame of the harrow, of a toggle joint the bars of which are connected at their outer ends to the gangs of disks for swinging them on their pivots, a slide bar connected to the knee of the toggle joint, a lever connected to the slide bar, and a spring actuating the lever in one direction; together with a lever for moving the aforesaid lever in the opposite direction, a rack and pawl for holding the last mentioned lever, and means for releasing the pawl.

8. In combination with a disk harrow having gangs of cutting disks each gang pivoted at one end to the supporting frame of the harrow, of a toggle joint the bars of which are connected at their outer ends to the gangs of disks for swinging them on their pivots, a slide bar connected to the knee of the toggle joint, a lever connected to the slide bar, and a spring actuating the lever in one direction; together with a hand lever connected to the aforesaid lever for moving the same in the opposite direction, a pawl on the hand lever engaging a rack for holding said lever, a lever for releasing the pawl, and ropes extending from the hand lever and pawl operating lever for operating the same.

9. In combination with a disk harrow having gangs of cutting disks each gang pivoted at one end to the supporting frame of the harrow, of a toggle joint the bars of which are connected at their outer ends to the gangs of disks for swinging them on their pivots, and a slide bar connected to the knee of the toggle joint; together with a lever connected to the slide bar, and auxiliary lever connected to the aforesaid lever, a spring actuating the levers in one direction, a hand lever connected to the auxiliary lever for moving the same in opposition to the spring, a sliding pawl on the hand lever engaging a rack to hold said hand lever in adjusted position, and a lever connected to the pawl for operating the same, the hand lever and pawl operating lever having ropes connected thereto and extending therefrom.

10. In combination with a disk harrow having gangs of cutting disks each gang pivoted at one end to the supporting frame of the harrow, of a toggle joint the bars of which are connected at their outer ends to the gangs of disks for swinging them on their pivots, and a slide bar connected to the knee of the toggle joint for operating the same; together with a channel bar having a bracket rising from one end thereof, a pair of levers pivoted to the upper end of the bracket to extend above and below the same, links connecting the lower end of the lever to the aforementioned slide bar, a pair of links pivoted at their lower ends to the other end of the channel bar, a link connecting the pairs of levers together, a spring connected to one pair of levers and to the channel bar for moving said pairs of levers in one direction, a hand lever pivoted at its lower end to the channel bar and connected to the aforesaid pairs of levers for moving the same in opposition to the spring, a segment rack secured to the channel bar, a sliding pawl on the hand lever for engagement with the segment rack, and a bent lever pivoted to the hand lever and connected to the pawl for operating the same, the hand lever and pawl operating lever having ropes extending from the upper ends thereof by which they are operated.

ALBERT G. PRYOR.